April 2, 1940.  H. N. R. CARLSON  2,196,139
AERIAL NAVIGATION CONTROL
Filed June 6, 1936  3 Sheets-Sheet 1
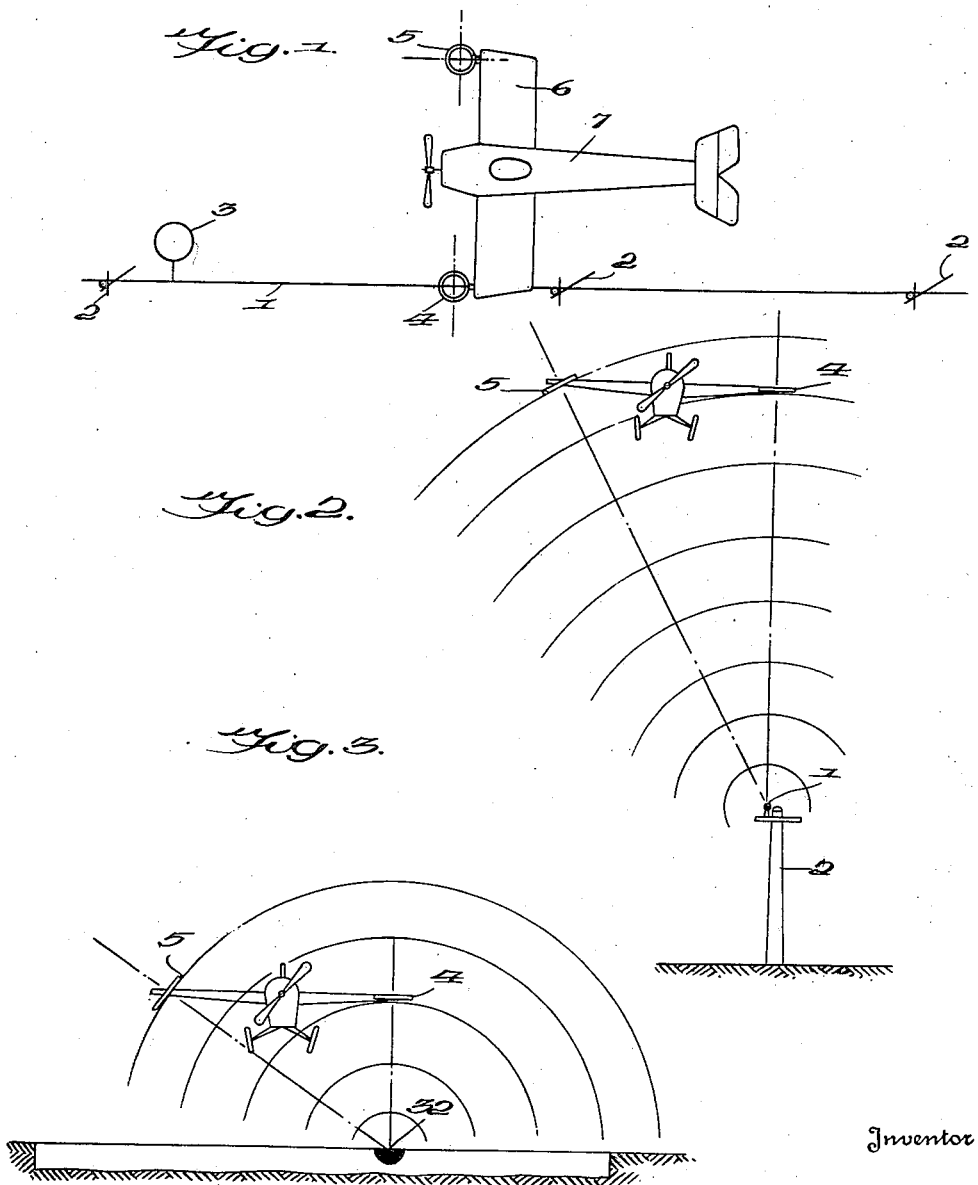

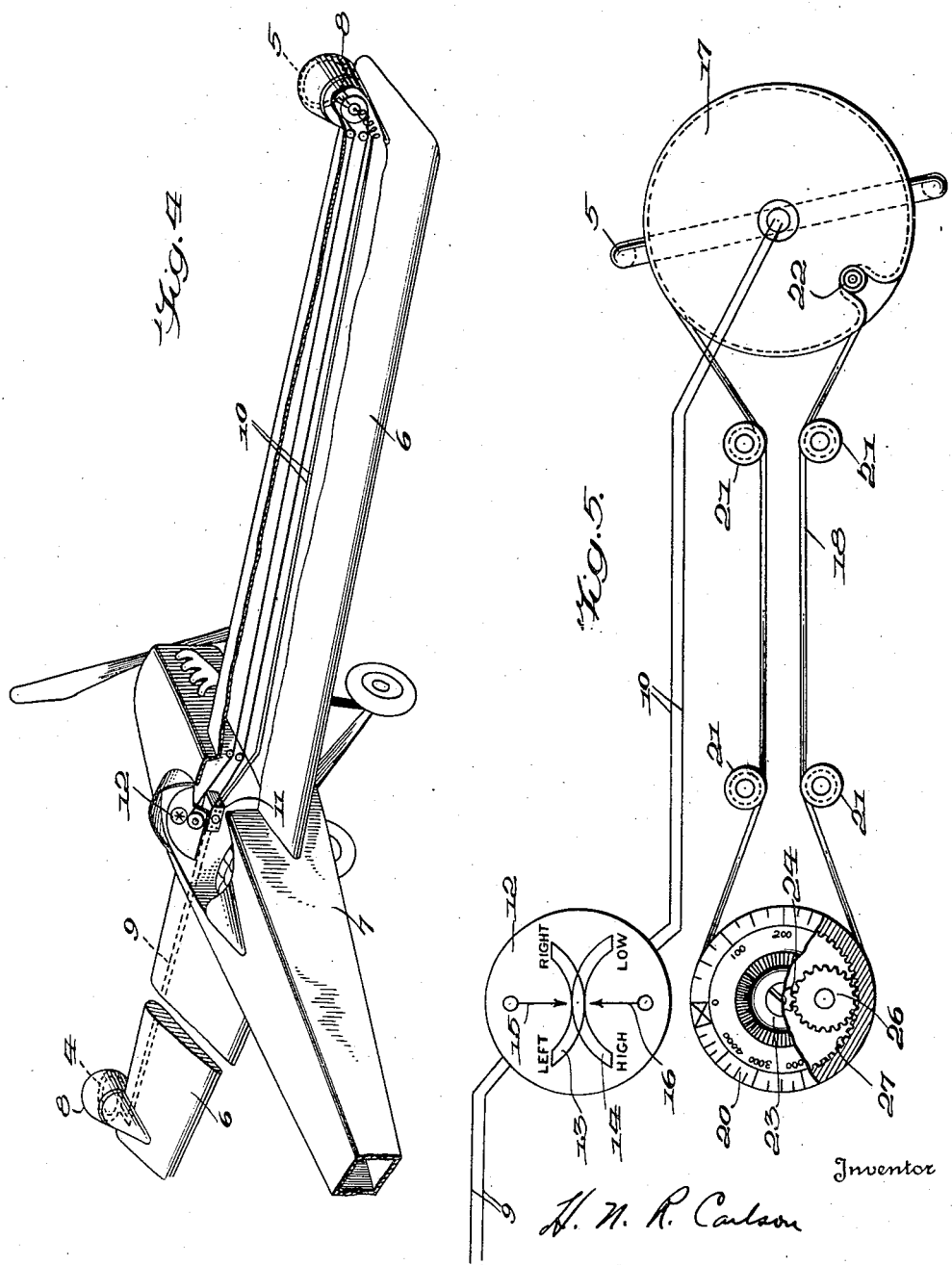

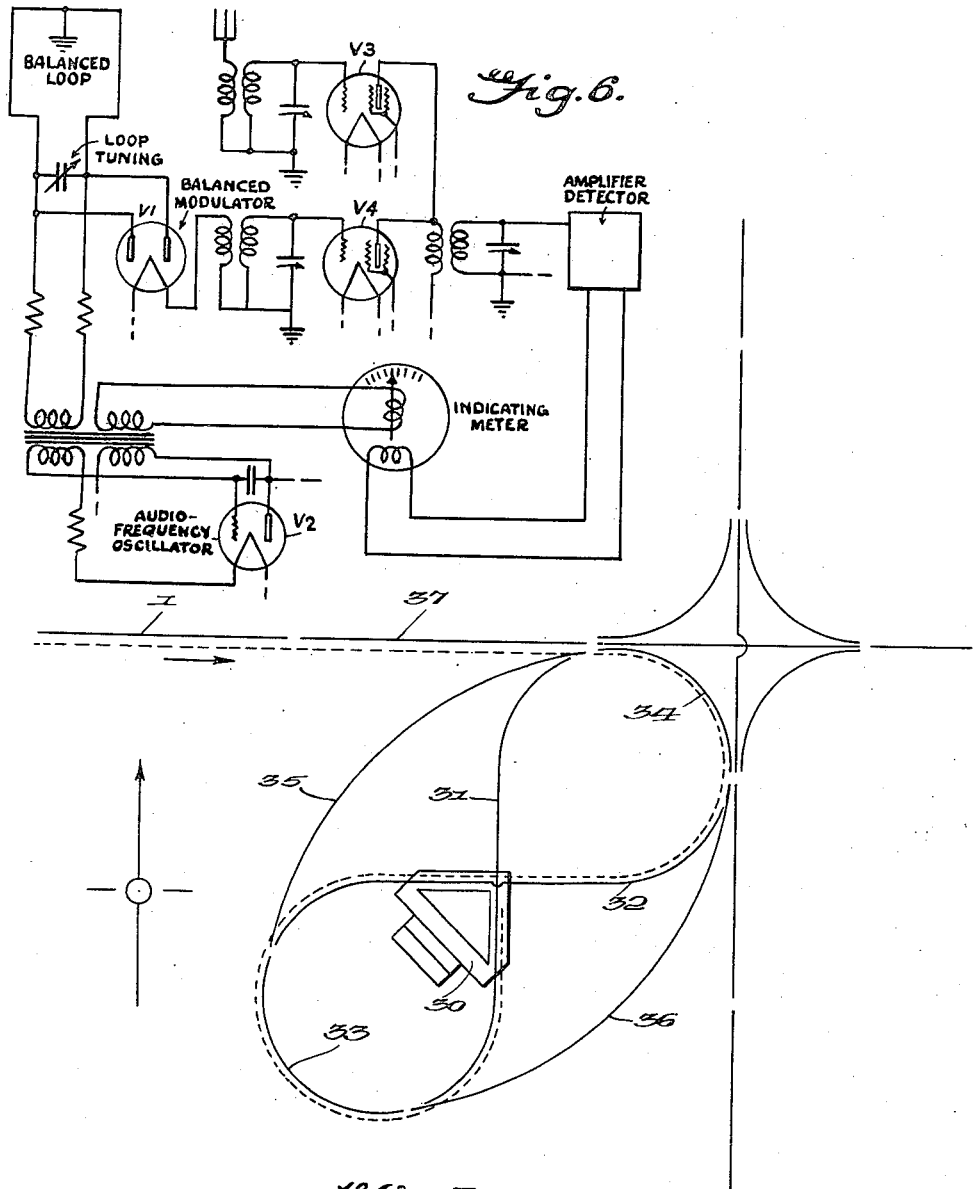

Patented Apr. 2, 1940

2,196,139

UNITED STATES PATENT OFFICE 2,196,139

AERIAL NAVIGATION CONTROL

Herbert N. R. Carlson, Chicago, Ill.

Application June 6, 1936, Serial No. 84,003

6 Claims. (Cl. 177—352)

This invention relates to an improvement in aerial navigation for the guidance of airships over predetermined lines or courses between different points, including the taking off and landing of the airships at the airports or landing fields, which form the terminals of such courses.

It has been proposed heretofore to navigate aircraft along a charged wire course, but such proposal did not make reliable provision whereby the operator of the airship may maintain or determine his position, course, and his proximity to the ground-surface, regardless of the conditions of visibility.

The object of the present invention is to provide practical and reliable means whereby the operator of an airship may maintain or determine his position, course, and his proximity to the ground-surface, regardless of the condition of visibility, with such a degree of accuracy as to be able to stay on a radio frequency charged wire course, and to take off from or land on airports or landing fields properly equipped according to this invention.

This is made possible by the use of a radio frequency charged wire along the course of flight and into the airport or landing field, in cooperation with two directional loop antennae mounted on the outer ends of the wings of an airplane or on opposite sides of an aircraft, with their electrical axes parallel with the direction of flight of the airship, but with one loop antenna rotatably mounted and controlled by the pilot of the airship and so connected with signals in the airship as to indicate positions of the airship relative to the charged wire course.

With this invention, it is possible to take off from or land on a flying field under any condition of visibility when that field is equipped according to this invention. It is also possible to maintain or determine any desired terrain flying altitude under any condition of visibility. Due to the absolute course and flying altitude control made possible by the use of this invention, the hazard of bringing airships into or out of flying fields in populated cities or other places having natural protruding hazards, during periods of poor visibility, is greatly reduced. Therefore, this invention not only lends itself to greater safety but also assists in maintaining commercial flying schedules, as well as increasing the effective flying periods.

Due to the accuracy of terrestrial altitude control of the airship under flight with this invention, the possibility of striking tall objects, hills, or mountain sides, is eliminated. For the same reason, it will be possible for airship pilots to maintain specific terrain flying levels for ships flying in opposite directions, thereby avoiding the possibility of collisions in the air.

Due to the design characteristics of the terrain altimeter indicating system used in connection with this invention, the need for frequent booster or repeater stations along this type of charged wire course is reduced to a minimum, as variations in charged wire field strength does not affect the accuracy of the navigational indicating system since it is dependent upon relative loop inductance direction with respect to the charged wire course rather than wire signals strengths received. Therefore, the cost of installation and maintenance of this system of charged wire aerial navigation control is more practical, accurate, and reliable than any suggested heretofore.

Robot or mechanical control of the airship along the charged wire course and at any set terrain altitude may be incorporated with this system of charged wire aerial navigational control by means of electrical control relays connected with the visual meter indicating circuits, together with the necessary electro-mechanical actuating mechanism connected with the piloting controls of the airship. This robot or automatic mechanical system of airship control may be used independently or supplementary to manual pilot control, or it may be refined to a point, if desired, due to the inherent and desirable features of this type of system of aerial navigational control, as to make possible the control of airships from fixed ground stations, so as to be able to send off airships from a given airport to and along a selected charged wire trunk route and at any selected terrain flying level, and to bring the airships down to any properly equipped airport without the assistance of a human pilot aboard the airship.

The principal advantage of such pilotless airships would be in the maintaining of high speed mail or commercial freight schedules during all kinds of flying weather without the risk of human life aboard the airship. This result could be accomplished by the use of a desired radio remote control system applied to the charged wire high frequency current system which lends itself to a more practical and reliable means of controlling the flight of an airship from or to a flying field and along a definite charged wire route.

The invention also eliminates the inherent characteristics of the radio beacon system of aerial navigational control, such as radio reception interference over long distances, the wide latitudes permitted regarded off course before signals can be heard for correction, the incorrect setting of the direction of the beam, and the complete loss of the course guidance if the beam fails. On the other hand, with the charged wire system of aerial navigation, in accordance with this invention, the radio reception distances are shorter and are mainly dependent upon direction from source (radio static will not affect its accuracy of course guidance); will hold the plane uniformly close to its charged wire course from take off to landing; failure of one section of the charged wire system does not affect the whole; and the true charged wire course cannot be altered without a change of ground pole line location.

I have illustrated a preferred embodiment of my invention in the accompanying drawings, in which:

Fig. 1 is a diagrammatic plan view of an airship flying over a charged wire course in accordance with this invention;

Fig. 2 is a diagrammatic front elevation thereof;

Fig. 3 is a similar view in which the charged wire course is along the surface of the ground, as in a landing field;

Fig. 4 is a perspective view, partly in section, of a portion of an airship, showing the invention applied thereto;

Fig. 5 is a diagrammatic view of the variable position loop control and meters;

Fig. 6 is a diagrammatic view of a receiver circuit; and

Fig. 7 is a diagrammatic plan view of the charged wire course as used at an airport.

As illustrated in Figs. 1 and 2, the charged wire course is provided by means of a wire 1, which is supported by poles 2, from which it is insulated in the customary manner of telephone and telegraph wires. In fact, the wire 1 may be supported on poles which also carry telephone and telegraph wires, if desired. The wire 1 is charged by a high frequency generating source or booster station, designated generally by the numeral 3 in Fig. 1. The high frequency current generated in the wire 1 forms radio waves surrounding the wire similar to toroids, which are diagrammatically illustrated in part in Figs. 2 and 3.

The altimeter system employed in the present invention in cooperation with the charged wire 1 comprises two directional loop antennae 4 and 5, mounted on the extreme outer ends of the wings 6 of an airplane, which is designated generally by the numeral 7. The loop antennae 4 and 5, have their directional rotary axes parallel with the direction of flight of the airship, or parallel with the charged wire 1. The loop 4 is mounted in a fixed position on the airship, while the loop 5 is rotatably mounted to turn about its electrical rotary axis parallel with the direction of flight of the airship.

As shown in Fig. 4, the loop antennae 4 and 5 are encased in non-magnetic or non-electrical interfering air streamlined cases 8. The loop antennae are connected by electrically shielded conductors 9 and 10, respectively, which lead to a radio receiver unit 11 in the cockpit or cabin of the airship 7 and which also includes visual indicating electric loop meters designated generally by the numeral 12. Radio receiving unit 11 may be of any commercial type that will actuate visual type indicating loop meters, such as a Western Electric 17A radio receiver used in connection with radio loop assembly and control unit indicating meters or the like, a diagrammatic view of which is shown in Fig. 6. Fig. 6 represents one of the wiring diagrams of the receiver, a similar receiving circuit being used for each loop and its meter.

As shown in Fig. 5, the visual indicating loop meter unit 12 has a dial with different scales 13 and 14 cooperating with indicating arms 15 and 16, respectively, the former of which is the fixed loop indicator or the charged wire course indicating meter, and the scale 13 therefor is graduated to indicate "left" and "right." When the receiving circuit is tuned to the desired frequency, variations in the position of each respective loop antenna is noted by deflection of the corresponding meter arm to the right or left. The indicator 15 swings in one direction or the other from its middle or zero position as the airship deviates to the left or right from its charged wire course of flight. Visual meter indicator 16 is the terrestial altitude indicator and swings in one direction or the other from a middle zero position over the scale 14 which is graduated to indicate "high" and "low" indicating positions as the airship deviates from a set terrestial flying altitude over the charged wire. This reading is true only when the indicator 15 is in a zero position while the fixed loop 4 is directly over the charged wire course, as also indicated by the zero position of the regular "bank and turn" instrument.

As shown in Figs. 4 and 5, the loop 5 is capable of rotary adjustment about an axis parallel with the direction of flight of the airship, for which purpose the loop 5 is attached to a pulley 17, which is connected by a flexible cable 18 with a pulley 19, shown in Fig. 6, on the back of a dial 20. The flexible cable 18 passes over guides 21 and may be anchored to each pulley 17 and 19, as is indicated at 22 in Fig. 5, in such relation that the pulleys 17 and 19 may be rotated, but pulley 19 with dial 20 will rotate through nearly 360°, while pulley 17 rotates through approximately 100°.

The dial 20 which is constructed to rotate the loop 5 is provided with a self-locking hand control assembly, shown in Fig. 5, including a knob 23, which may be turned relative to the dial 20 and carries a pinion 24. The pinion 24 normally meshes with a planet pinion 26, which in turn meshes with an internal gear 27 in the dial 20. When the hand control knob 23 is turned, its pinion 24 rotates the pinion 26 and ring gear 27 to turn the pulley 19 and through the cable 18, to rotate the pulley 17 and rotatable loop 5 to the desired position. This turning means may be locked in a set position in any well known or desired manner, so as to hold these parts against further rotation, thereby maintaining the loop 5 in a fixed position.

In accordance with the present invention, the wired radio altimeter system uses the simple trigometric principles of the right triangle, in which the wing span between the centers of the two radio loop antennae 4 and 5 forms a fixed base of an inverted right triangle, as illustrated in Figs. 2 and 3; a perpendicular line from this base from the center of the fixed loop 4 to the charged wire 1, forming the right angle leg, while the angle between the fixed base, represented by the wing span, and a line from the center of the variable loop 5, perpendicular to its plane, to the charged wire 1, forming the hypotenuse, makes it possible to calibrate this relation in terms of distance between the charged wire 1 and the fixed loop 4, or when a set of toroids or electrical loop inductance lines cross at the charged wire position as indicated by the zero positions of both indicator arms 15 and 16 of the visual indicating meter unit 12. The principle of distance determination, as herein pointed out, being quite similar to the optical range finding system used by the Army and Navy, need not be described in detail, inasmuch as the only difference is in the electric inductance direction of two radio loop antennae used instead of the visual direction of two telescopic eye pieces.

If the directional control loops are installed for maximum inductance direction indicating which results in somewhat broader tuning, then these loops may be used also to receive radio code or radio telephone signals that may be superimposed automatically or manually on the charged wire high frequency curent used as a carrier current. These various differentiating codes may be assigned to different sections of the charged wire system to be installed at repeater or booster stations or airports, that will give the pilot his position along the charged wire route. Upon the approach to any airport or the port of calling, the pilot would receive an identifying or designating code on the last incoming charged wire section which would give him time to report and forewarn the airport dispatching attendants and obtain his instructions, if it is his intention to land.

When the weather conditions are such that there is poor or no visibility, an alternate charged wire route may be set up by the radio control ground attendants that will direct the pilot along a course to a more desirable landing field. If it becomes necessary or compulsory to land under conditions of poor visibility, the radio ground attendants can set up a charged wire course into the landing field so that the airship will be guided into the airport along a selected runway in a definite direction, such that the pilot would encounter the prevailing head winds upon landing.

An illustration of this is shown in Fig. 7, which represents diagrammatically the charged wire sections of a landing field or airport, which are arranged generally in a "figure 8" type, making possible a definite routing of the airship from the trunk lines around and into the airport runways in the proper direction by reason of a control switchboard at the airport, so that the ground radio attendants may tie together electrically any path of charge wire sections desired for directing an airship into or out of the airport from or to any one of several trunk line routes.

The airport buildings are represented generally by the numeral 30, around which are arranged a series of charged wire sections, generally in "figure 8" form, made up of different sections, designated generally by the numerals 31, 32, 33, and 34, and two additional control sections 35 and 36, which latter may be used for reversing the airship flight over the "figure 8" landing loop. Hence with an airport switchboard having terminals connected with the respective wire sections, it is possible to tie together electrically any desired charged wire radio path, so as to guide an airship into the airport or out of the same from or to any trunk line route, into any runway in any direction.

For example, the dotted line in Fig. 7 represents the wire section hook-up for directing an airship out of the airport with a south head wind bound west, or for bringing an airship into the airport from the west with a north head wind blowing. This would include the main charged wire course 1, and a section 37 leading into the "figure 8" airport. Thus the sections 1, 37, 34, 32, 33, and 31 would be energized to complete the series in the arrangement shown, as represented by the dotted line. The cross wire sections or final landing charged wire sections 31 and 32, within the airport preferably are brought down parallel with the surface of the runway as represented in Fig. 3, in order to direct the airship downwardly to the ground.

Certain wire sections may be used to radiate radio code signals, sound, or letters so as to indicate to the pilot of the airship its location with respect to the various wire sections that he is over, and will thus guide him in a selection of flying altitudes to be taken upon the approach to the airport and to direct him to proper levels of descent upon approach to the final wire sections. The final landing charged wire sections 31 and 32 will also have their own designated radio codes or tones and when the pilot enters this wire leg or section for the purpose of landing, he can feel assured of his proper position and direction as he eases his airship in for landing, when visibility conditions do not permit him to see the ground or runway.

If the directional control loops are installed initially for minimum inductance indication, giving sharper tuning, it may be necessary to use a second fixed radio loop in the airship, set for maximum charged wire inductance, to pick up wired radio code or telephone signals on a separate receiver. With this arrangement, it is also possible to connect the two directional loops 4 and 5 electrically in separate or common radio receivers so as to induce audible carrier current or code signals through a radio speaker or the pilot's head phones as an audible alarm warning for the visual indicating loop meters, whenever the pilot is off his course or off his preselected flying level, at such times as he happens to be occupied with other visual piloting duties. This audible signal, as used in connection with the visual loop indicating meters will be heard whenever an off zero inductance position of either control loop occurs due to deviations from a true charged wire course or from a preselected ground flying level.

Two or more directional loops, one of which is fixed and one or more movable, may be set at a fixed distance but mounted vertically or at other proper angles relative to the electrical source, to be used in maintaining a definite course or direction, or for determining the distance to any known high frequency electrical or radio broadcasting source, such as a commercial or Government fixed radio broadcasting station, an airship, boat, or other form of conveyance or object having any electrical radiation that may be detected by a radio loop antenna and receiver. Such a system may be used either for aerial or nautical navigation control or it may be used to determine the direction of and the distance to any unknown electrical source of sufficient intensity to be detected by a directional radio loop and receiver, such as the electrical ignition of enemy airships or other craft whether in the air, or on land, or water. Such directional radio loop indicating system may be used for maintaining course or direction and determining distance to any known high frequency radio source for airships or nautical ships at sea, or it may be used for determining the direction or distance from any radio loop receiver to any moving object having high frequency radiations of sufficient intensity to be detected by a radio loop and receiver. Its usefulness to this end would be in determining the location of ships in distress, locating the range and distance to home or enemy aircraft in fog or at night, or locating the direction and distance to enemy submarines, based on the detection of electrical ignition or electrical motor radio disturbances.

I claim:

1. A method of navigating aircraft which comprises establishing a charged wire course, guiding an aircraft having laterally separated loop antennae along said course so as to maintain one of said antennae directly over said course, and moving another of said antennae to a position which is a predetermined function of the angle between lines connecting each of the antennae and the charged wire course.

2. A method of navigating aircraft along an established route which comprises maintaining a charged wire course along said route, said aircraft having laterally spaced directional loop antennae thereon, navigating the aircraft so as to maintain one of said antennae approximately over the charged wire route, and moving another antenna to a position which is a predetermined function of the angle between lines connecting each of the antennae and the charged wire course.

3. A method of navigating an airship having laterally spaced directional loop antennae thereon, one of which is fixed and the other is rotatable relative to the airship, which method comprises establishing a charged wire route along a predetermined course, guiding the airship so as to maintain said fixed antenna approximately over the charged wire route, and adjusting the rotary loop to a position which is a predetermined function of the angle between lines connecting each of the antennae and the charged wire course.

4. In aerial navigation, an airship having directional radio loop antennae mounted thereon in laterally spaced relation, one of said loops being fixed relative to the airship, another of said loops being rotatable relative thereto about an axis extending longitudinally of the direction of flight of the airship, separate indicating means connected respectively with the antennae for indicating by deflection from a zero position of each indicating means variations in the position of each respective antenna from its normal position relative to the source of radio waves received thereby.

5. In aerial navigation, an airship having directional radio loop antennae mounted thereon in laterally spaced relation, one of said loops being fixed relative to the airship, another of said loops being rotatable relative thereto about an axis extending longitudinally of the direction of flight of the airship, separate indicating means connected respectively with the antennae for indicating by deflection from a zero position of each indicating means variations in the position of each respective antenna from its normal position relative to the source of radio waves received thereby.

6. In aerial navigation, an airship having directional loop antennae mounted thereon in laterally spaced relation, one of said loops being fixed relative to the airship, another of said loops being rotatable relative thereto about an axis extending longitudinally of the direction of flight of the airship, separate indicating means connected respectively with the antennae for indicating by deflection from a zero position of each indicating means variations in the position of each respective antenna from its normal position relative to the source of radio waves received thereby, a cable operatively connected with said rotatable loop for turning the same, and a dial connected with said cable for moving the same.

HERBERT N. R. CARLSON.